United States Patent
Toyokawa et al.

(10) Patent No.: US 10,137,879 B2
(45) Date of Patent: Nov. 27, 2018

(54) CONTROL APPARATUS AND CONTROL METHOD FOR VEHICLE POWER TRANSMISSION SYSTEM

(71) Applicant: TOYOTA JIDOSHA KABUSHIKI KAISHA, Toyota-shi, Aichi-ken (JP)

(72) Inventors: Shuji Toyokawa, Toyota (JP); Masayasu Mizobuchi, Nissin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 197 days.

(21) Appl. No.: 15/405,429

(22) Filed: Jan. 13, 2017

(65) Prior Publication Data
US 2017/0203746 A1 Jul. 20, 2017

(30) Foreign Application Priority Data
Jan. 20, 2016 (JP) .................. 2016-009183

(51) Int. Cl.
F16H 61/00 (2006.01)
F16D 48/06 (2006.01)
(Continued)

(52) U.S. Cl.
CPC ........ B60W 10/026 (2013.01); B60W 10/023 (2013.01); F16D 48/066 (2013.01);
(Continued)

(58) Field of Classification Search
CPC .... F16H 45/02; F16H 2045/002; F16H 61/00; F16H 61/06; F16H 2061/0087;
(Continued)

(56) References Cited

U.S. PATENT DOCUMENTS 8,287,431 B2* 10/2012 Kobayashi ............ B60W 10/06
477/110
8,290,668 B2* 10/2012 Hirasako ......... B60W 30/18072
701/51

(Continued)

FOREIGN PATENT DOCUMENTS

JP H08-4888 A 1/1996
JP 2008-185089 A 8/2008
WO 2013/073307 A1 5/2013

*Primary Examiner* — Ramya P Burgess
*Assistant Examiner* — David R Morris
(74) *Attorney, Agent, or Firm* — Oliff PLC

(57) ABSTRACT

A control apparatus includes an ECU that is configured to: start engagement transition control for outputting an engagement transitional hydraulic pressure command value that causes an engagement device to be actuated from a released state toward an engaged state from when an operating member is displaced from a non-drive operating position; when an engagement transition time is longer than a target time, learn the engagement transitional hydraulic pressure command value such that the engagement transitional hydraulic pressure command value increases; when the engagement transition time is shorter than the target time, learn the engagement transitional hydraulic pressure command value such that the engagement transitional hydraulic pressure command value reduces; and prohibit learning of the engagement transitional hydraulic pressure command value or invalidate the learned engagement transitional hydraulic pressure command value, when the operating time of the operating member is longer than a predetermined time.

10 Claims, 8 Drawing Sheets

(51) Int. Cl.
  *F16H 45/02* (2006.01)
  *B60W 10/02* (2006.01)
  *F16H 61/14* (2006.01)
  *F16H 45/00* (2006.01)
  *F16H 3/66* (2006.01)
  *F16H 61/04* (2006.01)
  *F16H 61/06* (2006.01)

(52) U.S. Cl.
  CPC ............. *F16H 45/02* (2013.01); *F16H 61/00* (2013.01); *F16H 61/143* (2013.01); *B60W 2510/0233* (2013.01); *B60W 2710/024* (2013.01); *F16D 2500/1026* (2013.01); *F16D 2500/10412* (2013.01); *F16D 2500/10487* (2013.01); *F16H 3/663* (2013.01); *F16H 2045/002* (2013.01); *F16H 2061/0087* (2013.01); *F16H 2061/0485* (2013.01); *F16H 2061/0488* (2013.01); *F16H 2061/064* (2013.01); *F16H 2200/006* (2013.01); *F16H 2200/201* (2013.01); *F16H 2200/2025* (2013.01); *F16H 2200/2046* (2013.01); *F16H 2200/2066* (2013.01); *F16H 2200/2082* (2013.01); *F16H 2200/2097* (2013.01)

(58) Field of Classification Search
  CPC ..... F16H 2061/0485; F16H 2061/0488; F16H 2061/064; F16D 48/066; F16D 2500/1026; F16D 2500/10412; F16D 2500/10487
  See application file for complete search history.

(56) References Cited

U.S. PATENT DOCUMENTS

| | | | |
|---|---|---|---|
| 9,026,328 B2 * | 5/2015 | Akebono | ................ F16H 61/02 477/174 |
| 2009/0240410 A1 * | 9/2009 | Shinohara | ............ F16D 48/066 701/59 |
| 2009/0248263 A1 * | 10/2009 | Kubo | .................... B60W 30/19 701/55 |
| 2010/0056332 A1 * | 3/2010 | Kobayashi | ............ B60W 10/06 477/110 |
| 2010/0250074 A1 * | 9/2010 | Hirasako | ......... B60W 30/18072 701/55 |
| 2014/0324307 A1 | 10/2014 | Akebono | |

* cited by examiner

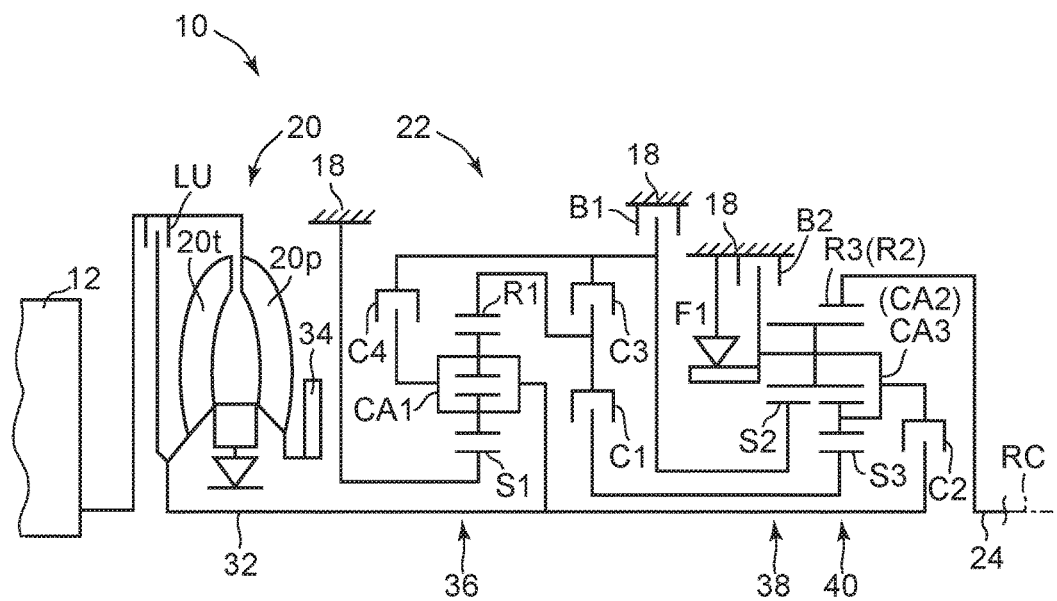

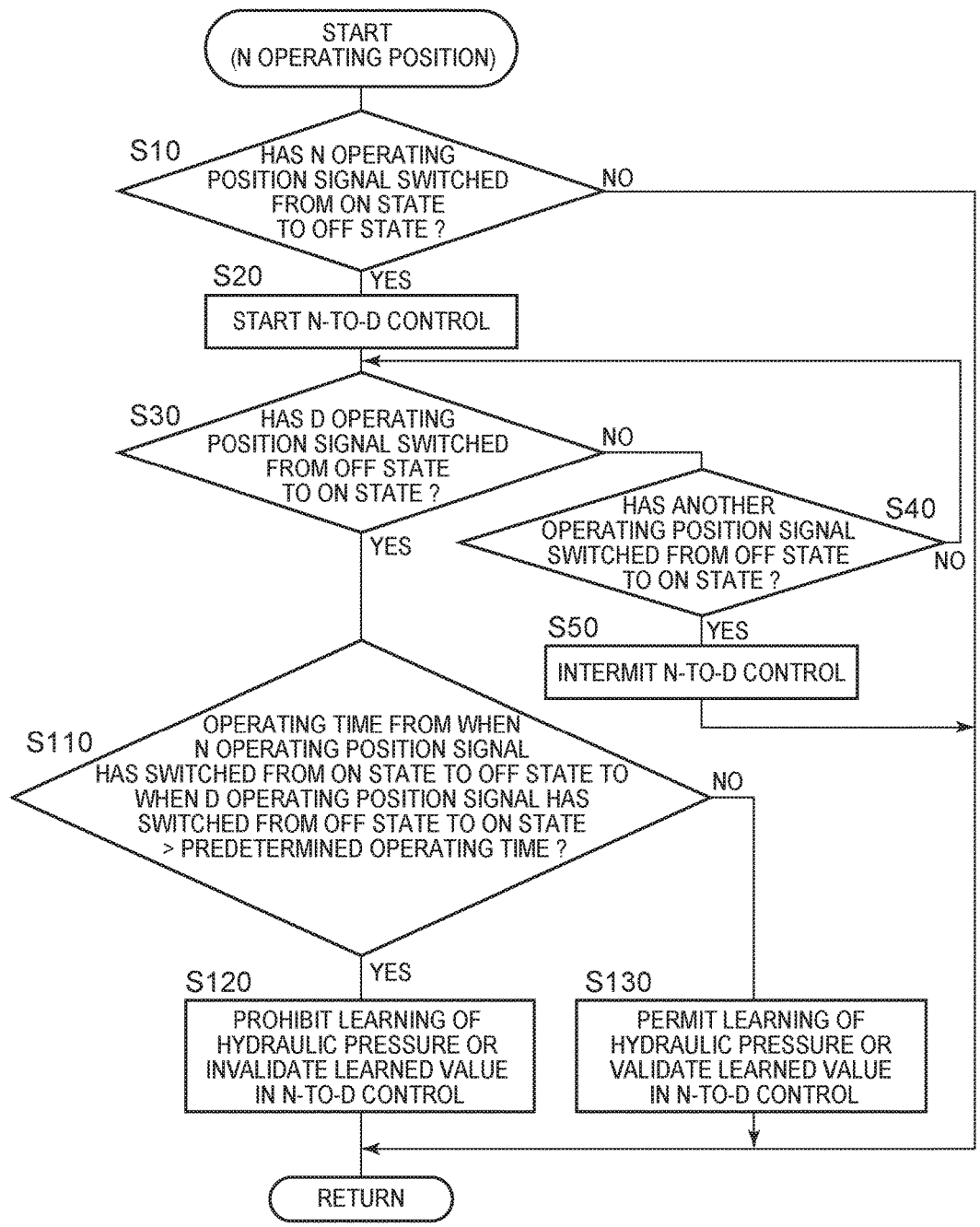

CONTROL APPARATUS AND CONTROL METHOD FOR VEHICLE POWER TRANSMISSION SYSTEM

INCORPORATION BY REFERENCE

The disclosure of Japanese Patent Application No. 2016-009183 filed on Jan. 20, 2016 including the specification, drawings and abstract is incorporated herein by reference in its entirety.

BACKGROUND

1. Technical Field

The disclosure relates to a control apparatus and control method for a vehicle power transmission system including an engagement device that connects or interrupts a power transmission path between a driving force source and a drive wheel.

2. Description of Related Art

International Application Publication No. 2013/073307 describes a vehicle power transmission system including an engagement device that connects or interrupts a power transmission path between a driving force source and a drive wheel. The vehicle power transmission system includes a hydraulic control unit. The hydraulic control unit engages the engagement device when an operating member is in a drive operating position, and releases the engagement device when the operating member is in a non-drive operating position. International Application Publication No. 2013/073307 describes the following technique. When a select lever is shifted from a neutral range (hereinafter, referred to as N range) to a drive range (hereinafter, referred to as D range), the stroke of a hydraulic piston is made by increasing a command hydraulic pressure, which is issued to a start friction engagement element, to an ordinary hydraulic pressure, and the command hydraulic pressure is subjected to learning control such that a time from when the range is changed from the N range to the D range to when the start friction engagement element begins to develop a transmission capacity becomes a predetermined target time. Specifically, when a time from when it is determined that the select lever has been operated from the N range to the D range to when the phase of the stroke of the piston ends is longer than the predetermined target time, it is determined that precharge pressure is insufficient. Then, learning control for increasing the next command hydraulic pressure is executed. At this time, when a driver's intention to start moving the vehicle has been detected during the phase of the stroke of the piston, learning control is prohibited.

SUMMARY

When the output of a hydraulic pressure command value for actuating the engagement device from a released state to an engaged state is started from when the operating member has been operated to the drive operating position, control for engaging the engagement device is not executed during the transition in which the operating member is being operated from the non-drive operating position to the drive operating position. For this reason, as an operating time from the non-drive operating position to the drive operating position extends, response decreases. If a predetermined target time is set irrespective of the operating time, when the hydraulic pressure command value is subjected to learning control on the basis of a time from when the operating member has been displaced from the non-drive operating position to when the engagement device begins to develop a torque capacity (which is synonymous with transmission capacity), learning control is executed including a mode in which the operating time from the non-drive operating position to the drive operating position is relatively long, so there is a possibility that hydraulic pressure that is supplied to the engagement device is excessive or deficient. Specifically, in a mode in which an actual hydraulic pressure rises as a result of operation to the drive operating position, if the operating time from the non-drive operating position to the drive operating position is long, the rising of the actual hydraulic pressure also delays, so a time that is taken until the engagement device begins to develop a torque capacity may be longer than the predetermined target time. In this case, learning for correcting the next hydraulic pressure command value to increase is performed in order to reduce a time that is taken until the engagement device begins to develop a torque capacity. However, when the operating time from the non-drive operating position to the drive operating position is shortened during the next control, there is a possibility that the hydraulic pressure command value is redundantly increased as a result of the learning.

The disclosure provides a control apparatus and control method for a vehicle power transmission system, which are able to prevent a decrease in the accuracy of learning an engagement transitional hydraulic pressure command value that is used in engagement transition control for actuating an engagement device from a released state to an engaged state, the engagement transition control being started from a start point at which an operating member has been displaced from a non-drive operating position.

An first aspect of the disclosure provides a control apparatus for a power transmission system for a vehicle. The vehicle includes a driving force source, a drive wheel, an engagement device and an operating member. The engagement device is configured to connect or interrupt a power transmission path between the driving force source and the drive wheel. The control apparatus includes an electronic control unit. The electronic control unit is configured to execute control for engaging the engagement device when the operating member is in a drive operating position. The electronic control unit is configured to execute control for releasing the engagement device when the operating member is in a non-drive operating position. The electronic control unit is configured to start engagement transition control for outputting an engagement transitional hydraulic pressure command value that causes the engagement device to be actuated from a released state toward an engaged state at a start point at which the operating member has been displaced from the non-drive operating position. The electronic control unit is configured to determine whether an engagement transition time from when the engagement transition control is started to when the engagement device begins to develop a predetermined torque capacity is longer or shorter than a predetermined target time. The electronic control unit is configured to, when the engagement transition time is longer than the predetermined target time, learn an engagement transitional hydraulic pressure command value that is used in next engagement transition control such that the engagement transitional hydraulic pressure command value increases. The electronic control unit is configured to, when the engagement transition time is shorter than the predetermined target time, learn the engagement transitional hydraulic pressure command value that is used in the next engagement transition control such that the engagement transitional hydraulic pressure command value reduces. The electronic control unit is configured to determine whether an operating time from when the operating member has been displaced from the non-drive operating position to when the operating member has been shifted into the drive operating position is longer than a predetermined operating time. The electronic control unit is configured to prohibit learning of the engagement transitional hydraulic pressure command value when the operating time is longer than the predetermined operating time.

In the control apparatus, the operating time may be an operating time from when the operating member has been displaced from a neutral operating position to when the operating member has been shifted into a forward drive operating position. The neutral operating position may be an operating position in which the power transmission path between the driving force source and the drive wheel is placed in a neutral state where transmission of power is disabled by releasing the engagement device. The forward drive operating position may be an operating position in which the power transmission path is placed in a power transmittable state where a power transmission path for forward traveling is established by engaging the engagement device.

In the control apparatus, the power transmission system may include an automatic transmission. The automatic transmission may constitute part of the power transmission path between the driving force source and the drive wheel. The automatic transmission may include an input rotating member. The engagement transition time may be an inertia phase start time from when the engagement transition control is started to when a rotation speed of the input rotating member begins to vary.

In the control apparatus, the power transmission system may include a hydraulic control circuit. The hydraulic control circuit may be configured to supply hydraulic pressure to the engagement device on the basis of the engagement transitional hydraulic pressure command value. The hydraulic control circuit may include a manual valve. The manual valve may be configured to mechanically switch an oil path in synchronization with shift operation of the operating member such that a source pressure of hydraulic pressure that is supplied to the engagement device is output.

A second aspect of the disclosure provides a control apparatus for a power transmission system for a vehicle. The vehicle includes a driving force source, a drive wheel, an engagement device and an operating member. The engagement device is configured to connect or interrupt a power transmission path between the driving force source and the drive wheel. The control apparatus includes an electronic control unit. The electronic control unit is configured to execute control for engaging the engagement device when the operating member is in a drive operating position. The electronic control unit is configured to execute control for releasing the engagement device when the operating member is in a non-drive operating position. The electronic control unit is configured to start engagement transition control for outputting an engagement transitional hydraulic pressure command value that causes the engagement device to be actuated from a released state toward an engaged state at a start point at which the operating member has been displaced from the non-drive operating position. The electronic control unit is configured to determine whether an engagement transition time from when the engagement transition control is started to when the engagement device begins to develop a predetermined torque capacity is longer or shorter than a predetermined target time. The electronic control unit is configured to, when the engagement transition time is longer than the predetermined target time, learn an engagement transitional hydraulic pressure command value that is used in next engagement transition control such that the engagement transitional hydraulic pressure command value increases. The electronic control unit is configured to, when the engagement transition time is shorter than the predetermined target time, learn the engagement transitional hydraulic pressure command value that is used in the next engagement transition control such that the engagement transitional hydraulic pressure command value reduces. The electronic control unit is configured to determine whether an operating time from when the operating member has been displaced from the non-drive operating position to when the operating member has been shifted into the drive operating position is longer than a predetermined operating time. The electronic control unit is configured to invalidate the learned engagement transitional hydraulic pressure command value when the operating time is longer than the predetermined operating time.

A third aspect of the disclosure provides a control method for a power transmission system for a vehicle. The vehicle includes a driving force source, a drive wheel, an engagement device and an operating member. The engagement device is configured to connect or interrupt a power transmission path between the driving force source and the drive wheel. The control method comprising: executing control for engaging the engagement device when the operating member is in a drive operating position; executing control for releasing the engagement device when the operating member is in a non-drive operating position; starting engagement transition control for outputting an engagement transitional hydraulic pressure command value that causes the engagement device to be actuated from a released state toward an engaged state at a start point at which the operating member has been displaced from the non-drive operating position; determining whether an engagement transition time from when the engagement transition control is started to when the engagement device begins to develop a predetermined torque capacity is longer or shorter than a predetermined target time; when the engagement transition time is longer than the predetermined target time, learning an engagement transitional hydraulic pressure command value that is used in next engagement transition control such that the engagement transitional hydraulic pressure command value increases; when the engagement transition time is shorter than the predetermined target time, learning the engagement transitional hydraulic pressure command value that is used in the next engagement transition control such that the engagement transitional hydraulic pressure command value reduces; determining whether an operating time from when the operating member has been displaced from the non-drive operating position to when the operating member has been shifted into the drive operating position is longer than a predetermined operating time; and prohibiting learning of the engagement transitional hydraulic pressure command value when the operating time is longer than the predetermined operating time.

A fourth aspect of the disclosure provides a control method for a power transmission system for a vehicle. The vehicle includes a driving force source, a drive wheel, an engagement device and an operating member. The engagement device is configured to connect or interrupt a power transmission path between the driving force source and the drive wheel. The control method comprising: executing control for engaging the engagement device when the operating member is in a drive operating position; executing control for releasing the engagement device when the operating member is in a non-drive operating position; starting engagement transition control for outputting an engagement transitional hydraulic pressure command value that causes the engagement device to be actuated from a released state toward an engaged state at a start point at which the operating member has been displaced from the non-drive operating position; determining whether an engagement transition time from when the engagement transition control is started to when the engagement device begins to develop a predetermined torque capacity is longer or shorter than a predetermined target time; when the engagement transition time is longer than the predetermined target time, learning an engagement transitional hydraulic pressure command value that is used in next engagement transition control such that the engagement transitional hydraulic pressure command value increases; when the engagement transition time is shorter than the predetermined target time, learning the engagement transitional hydraulic pressure command value that is used in the next engagement transition control such that the engagement transitional hydraulic pressure command value reduces; determining whether an operating time from when the operating member has been displaced from the non-drive operating position to when the operating member has been shifted into the drive operating position is longer than a predetermined operating time; and invalidating the learned engagement transitional hydraulic pressure command value when the operating time is longer than the predetermined operating time.

With the above configuration, when the operating time from when the operating member has been displaced from the non-drive operating position to when the operating member has been shifted into the drive operating position is longer than the predetermined operating time, learning of the engagement transitional hydraulic pressure command value that is used in the engagement transition control for causing the engagement device to be actuated from the released state toward the engaged state, which is started at the start point at which the operating member has been displaced from the non-drive operating position, is prohibited or the learned engagement transitional hydraulic pressure command value is invalidated. For this reason, when the operating time of the operating member is longer than the predetermined operating time, the engagement transition time from when the engagement transition control is started to when the engagement device begins to develop the predetermined torque capacity extends. With the above configuration, in this case, the engagement transitional hydraulic pressure command value that is used in the next engagement transition control is not increased. Thus, it is possible to prevent a decrease in the accuracy of learning an engagement transitional hydraulic pressure command value that is used in the engagement transition control.

With the above configuration, when the operating time from when the operating member has been displaced from the neutral operating position to when the operating member has been shifted into the forward drive operating position is longer than the predetermined operating time, the engagement transition time from when the engagement transition control is started to when the engagement device begins to develop the predetermined torque capacity extends. In this case, by prohibiting learning of the engagement transitional hydraulic pressure command value or invalidating the learned engagement transitional hydraulic pressure command value in order not to increase the engagement transitional hydraulic pressure command value that is used in the next engagement transition control, it is possible to prevent a decrease in the accuracy of learning an engagement transitional hydraulic pressure command value that is used in the engagement transition control.

With the above configuration, the engagement transition time from when the engagement transition control is started to when the engagement device begins to develop the predetermined torque capacity is the inertia phase start time from when the engagement transition control is started to when the rotation speed of the input rotating member of the automatic transmission begins to vary. For this reason, the engagement transition time is appropriately detected on the basis of a variation in the rotation speed of the input rotating member.

With the above configuration, the source pressure of hydraulic pressure that is supplied to the engagement device on the basis of the engagement transitional hydraulic pressure command value is output from the manual valve of which the oil path is mechanically switched in synchronization with shift operation of the operating member. For this reason, when the operating time from when the operating member has been displaced from the non-drive operating position to when the operating member has been shifted into the drive operating position is longer than the predetermined operating time, the rising of hydraulic pressure that is supplied to the engagement device delays, and the engagement transition time from when the engagement transition control is started to when the engagement device begins to develop the predetermined torque capacity becomes longer. In this case, by prohibiting learning of the engagement transitional hydraulic pressure command value or invalidating the learned engagement transitional hydraulic pressure command value in order not to increase the engagement transitional hydraulic pressure command value that is used in the next engagement transition control, it is possible to prevent a decrease in the accuracy of learning an engagement transitional hydraulic pressure command value that is used in the engagement transition control.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a skeletal view that illustrates an example of a torque converter and an example of an automatic transmission;

FIG. 3 is an operation chart that illustrates the relationship between shift operation of the automatic transmission and a combination of operated states of engagement devices that are used for the shift operation;

FIG. 9 is a flowchart that illustrates a relevant portion of control operations of the electronic control unit, that is, control operations for preventing a decrease in the accuracy of learning an engagement transitional hydraulic pressure command value that is used in N-to-D control.

DETAILED DESCRIPTION OF EMBODIMENTS

Hereinafter, an embodiment will be described in detail with reference to the accompanying drawings.

Figure 1:
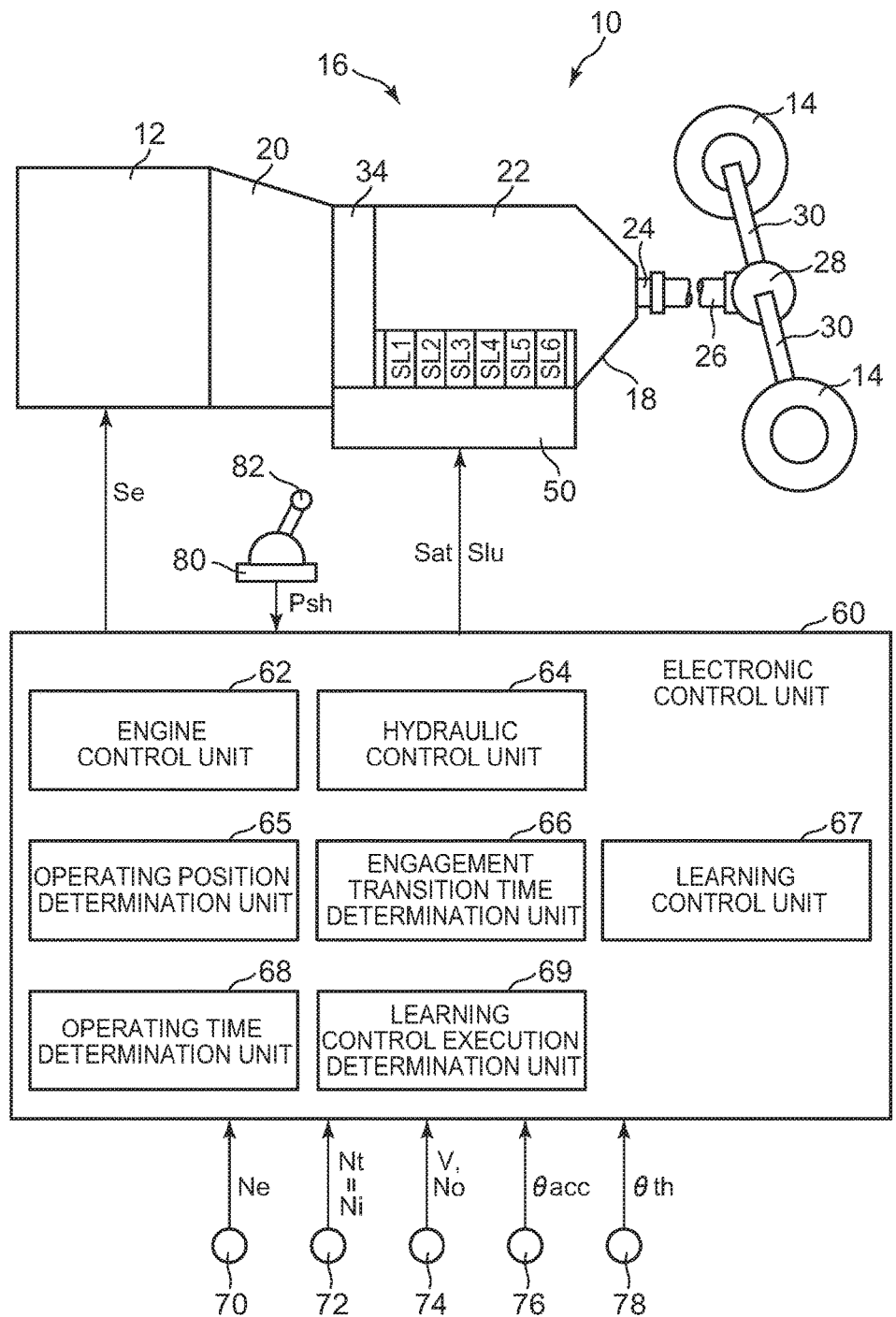
FIG. 1 is a view that illustrates the schematic configuration of a vehicle according to an embodiment and is a view that illustrates a relevant portion of control functions and control system for various control in the vehicle.

FIG. 1 is a view that illustrates the schematic configuration of a vehicle 10 according to the present embodiment, and is a view that illustrates a relevant portion of control system for various control in the vehicle 10. As shown in FIG. 1, the vehicle 10 includes an engine 12, drive wheels 14 and a vehicle power transmission system (hereinafter, referred to as power transmission system 16). The power transmission system 16 is provided in a power transmission path between the engine 12 and the drive wheels 14. The power transmission system 16 includes a case 18, a torque converter 20, an automatic transmission 22, a propeller shaft 26, a differential gear unit 28, a pair of axles 30, and the like. The case 18 serves as a non-rotating member that is mounted on a vehicle body. The torque converter 20 and the automatic transmission 22 are arranged inside the case 18. The propeller shaft 26 is coupled to a transmission output shaft 24 that is an output rotating member of the automatic transmission 22. The differential gear unit 28 is coupled to the propeller shaft 26. The pair of axles 30 are coupled to the differential gear unit 28. In the power transmission system 16, power (which is synonymous with torque and force when not specifically distinguished from each other) that is output from the engine 12 is transmitted to the drive wheels 14 sequentially via the torque converter 20, the automatic transmission 22, the propeller shaft 26, the differential gear unit 28, the axles 30, and the like.

The engine 12 is the driving force source of the vehicle 10, and is an internal combustion engine, such as a gasoline engine and a diesel engine. An electronic control unit 60 (described later) controls an operating state, such as an intake air amount, a fuel supply amount and ignition timing. Thus, an engine torque Te of the engine 12 is controlled.

FIG. 2 is a skeletal view that illustrates an example of the torque converter 20 and an example of the automatic transmission 22. The torque converter 20, the automatic transmission 22, and the like, each are substantially symmetric with respect to an axis RC of a transmission input shaft 32 that is an input rotating member of the automatic transmission 22. In FIG. 2, the lower half below the axis RC is omitted.

In FIG. 2, the torque converter 20 is arranged so as to rotate around the axis RC. The torque converter 20 includes a pump impeller 20p and a turbine runner 20t. The pump impeller 20p is coupled to the engine 12. The turbine runner 20t is coupled to the transmission input shaft 32. The torque converter 20 includes a lockup clutch LU that is able to directly connect the pump impeller 20p and the turbine runner 20t (that is, the input and output rotating members of the torque converter 20) with each other. In this way, the torque converter 20 is a fluid transmission device including the lockup clutch LU and provided in a power transmission path between the engine 12 and the automatic transmission 22. The power transmission system 16 includes a mechanical oil pump 34 coupled to the pump impeller 20p. The oil pump 34 generates (discharges) working hydraulic pressure for controlling a shift of the automatic transmission 22, engaging the lockup clutch LU or supplying lubricating oil to various portions of the power transmission path of the power transmission system 16 by being driven by the engine 12 to rotate.

The automatic transmission 22 is a stepped automatic transmission that constitutes part of the power transmission path between the engine 12 and the drive wheels 14. The automatic transmission 22 is a planetary gear multi-stage transmission including a plurality of planetary gear trains and a plurality of engagement devices. When predetermined engagement devices among the plurality of engagement devices are engaged, a plurality of gear positions (speed positions) having different gear ratios (speed ratios) γ (=AT input rotation speed Ni/AT output rotation speed No) are selectively established. The automatic transmission 22 is a stepped transmission that performs a so-called clutch-to-clutch shift. The AT input rotation speed Ni is the rotation speed of the transmission input shaft 32. The AT output rotation speed No is the rotation speed of the transmission output shaft 24.

The automatic transmission 22 includes a double pinion first planetary gear train 36, a single pinion second planetary gear train 38 and a double pinion third planetary gear train 40 along the same axis (axis RC). The second planetary gear train 38 and the third planetary gear train 40 constitute a Ravigneaux type. The automatic transmission 22 changes the rotation of the transmission input shaft 32 in speed, and outputs the rotation from the transmission output shaft 24. In the automatic transmission 22, rotating elements (sun gears S1, S2, S3, carriers CA1, CA2, CA3 and ring gears R1, R2, R3) of the first planetary gear train 36, second planetary gear train 38 and third planetary gear train 40 are partially coupled to each other or coupled to the transmission input shaft 32, the case 18 or the transmission output shaft 24 directly or indirectly (or selectively) via the engagement devices.

The plurality of engagement devices are friction engagement devices and a one-way clutch F1. The friction engagement devices are clutches C1, C2, C3, C4 and brakes B1, B2 (hereinafter, simply referred to as engagement devices C when not specifically distinguished from each other). Each of the engagement devices C is a hydraulic friction engagement device formed of a wet multi-disc clutch or brake that is pressed by a hydraulic actuator, a band brake that is fastened by a hydraulic actuator, or the like. An engaged or released state of each of the engagement devices C is changed when a corresponding torque capacity (that is, clutch torque) is varied by hydraulic pressure that is output from a corresponding one of linear solenoid valves SL1 to SL6, and the like, in a hydraulic control circuit 50 (see FIG. 1 and FIG. 5) provided in the power transmission system 16.

When the electronic control unit 60 (described later) controls the engaged or released state of each of the engagement devices C, each of the gear positions, that is, forward eight gear positions and reverse one gear position, is established in the automatic transmission 22 in response to a driver's accelerator operation, a vehicle speed V, and the like, as shown in the engagement operation chart of FIG. 3. In FIG. 3, "1st" to "8th" denote a first-speed gear position to an eighth-speed gear position as the forward gear positions, "Rev" denotes the reverse gear position, "N" denotes a neutral state where any gear position is not established, and "P" denotes the neutral state and a state where the rotation of the transmission output shaft 24 is mechanically blocked (locked). Each of the engagement devices C is an engagement device that connects or interrupts the power transmission path between the engine 12 and the drive wheels 14 (that is, switches between an interrupted state where the power transmission path is not established and a connected state where the power transmission path is established). The gear ratio γ of the automatic transmission 22, which corresponds to each gear position, is determined as needed by the gear ratios ρ1, ρ2, ρ3 (=Number of teeth of the corresponding sun gear/Number of teeth of the corresponding ring gear) of the first planetary gear train 36, second planetary gear train 38 and third planetary gear train 40.

The engagement operation chart of FIG. 3 summarizes the relationship between each gear position and corresponding operated states of the plurality of engagement devices. The circle mark denotes an engaged state, the double circle mark denotes an engaged state when being driven (during engine brake), and the blank denotes a released state. In the automatic transmission 22, the one-way clutch F1 is provided in parallel with the brake B2 between the integrally coupled carriers CA2, CA3 and the case 18. The one-way clutch F1 permits forward rotation (the same rotation direction as the transmission input shaft 32) of those carriers CA2, CA3, and blocks reverse rotation of those carriers CA2, CA3. Therefore, when the drive wheels 14 side is driven to rotate from the engine 12 side, the first-speed gear position "1st" is established by automatic engagement of the one-way clutch F1 by just engaging the clutch C1 even when the brake B2 is not engaged.

Referring back to FIG. 1, the vehicle 10, for example, includes the electronic control unit 60 including a control apparatus for the power transmission system 16 associated with, for example, control for changing the operated state of each engagement device C. FIG. 1 is a view that shows the input/output lines of the electronic control unit 60, and is a functional block diagram that illustrates a relevant portion of control functions that are executed by the electronic control unit 60. The electronic control unit 60 includes a so-called microcomputer. The microcomputer includes, for example, a CPU, a RAM, a ROM, input/output interfaces, and the like. The CPU executes various control over the vehicle 10 by executing signal processing in accordance with programs prestored in the ROM while utilizing the temporary storage function of the RAM. For example, the electronic control unit 60 is configured to execute output control over the engine 12, shift control over the automatic transmission 22, lockup control over the lockup clutch LU, and the like. Where necessary, the electronic control unit 60 is divided into an electronic control unit for engine control, an electronic control unit for hydraulic pressure control (for shift control), and the like.

Various actual values based on detected signals detected by various sensors provided in the vehicle 10 are supplied to the electronic control unit 60. The various sensors, for example, include an engine rotation speed sensor 70, an input rotation speed sensor 72, an output rotation speed sensor 74, an accelerator operation amount sensor 76, a throttle valve opening degree sensor 78, a shift position sensor 80, and the like. The various actual values based on detected signals, for example, include an engine rotation speed Ne, the AT input rotation speed Ni that is a turbine rotation speed Nt, the AT output rotation speed No corresponding to a vehicle speed V, an accelerator operation amount θacc that is the operation amount of an accelerator pedal, a throttle valve opening degree θth that is the opening degree of an electronic throttle valve, the operating position Psh (also referred to as shift position or lever position) of a shift lever 82 that is an example of an operating member, and the like. An engine output control command signal Se, a hydraulic control command signal Sat, a hydraulic control command signal Slu, and the like, are output from the electronic control unit 60. The engine output control command signal Se is used to control the output power of the engine 12. The hydraulic control command signal Sat is used to control hydraulic pressure associated with a shift of the automatic transmission 22. The hydraulic control command signal Slu is used to control a change of the operated state of the lockup clutch LU. The hydraulic control command signal Sat is a command signal (hydraulic pressure command value) for driving each of the linear solenoid valves SL1 to SL6 that respectively regulate hydraulic pressures supplied to hydraulic actuators ACT1 to ACT6 of the corresponding engagement devices C, and is output to the hydraulic control circuit 50.

Figure 4:
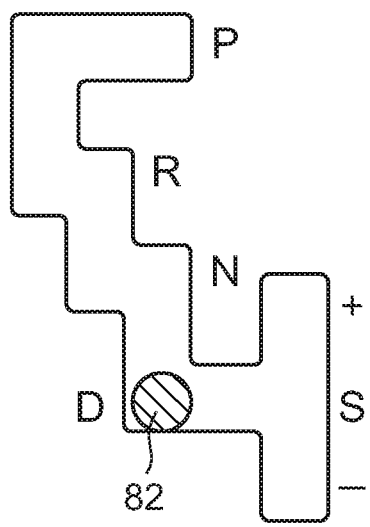
FIG. 4 is a view that shows an example of operating positions of a shift lever.

FIG. 4 is a view that shows an example of the operating positions Psh of the shift lever 82. As shown in FIG. 4, the shift lever 82 is manually operated to the operating position "P", "R", "N", "D" or "S". The operating position "P" is a parking operating position (hereinafter, referred to as P operating position) for selecting a parking position (P position) of the automatic transmission 22 and placing the automatic transmission 22 in a neutral state where the power transmission path is interrupted (neutral state) (that is, placing the power transmission path between the engine 12 and the drive wheels 14 in a neutral state where transmission of power is disabled by releasing the engagement devices C) and mechanically blocking the rotation of the transmission output shaft 24. The operating position "R" is a reverse drive operating position (hereinafter referred to as R operating position) for selecting a reverse drive position R (R position) of the automatic transmission 22 and causing the vehicle 10 to reverse. The R operating position is a drive operating position that enables the vehicle 10 to reverse with the use of the reverse gear position of the automatic transmission 22. The operating position "N" is a neutral operating position N (hereinafter referred to as N operating position) for selecting a neutral position (N position) of the automatic transmission 22 and placing the automatic transmission 22 in the neutral state. Each of the P operating position and the N operating position is a non-drive operating position in which the vehicle 10 is disabled to travel by using the power of the engine 12. The operating position "D" is a forward drive operating position D (hereinafter, referred to as D operating position) for selecting a forward drive position (D position) of the automatic transmission 22 and causing the vehicle 10 to travel forward. That is, the D operating position is an operating position in which the power transmission path between the engine 12 and the drive wheels 14 is placed in a power transmittable state where a power transmission path for forward traveling is established by engaging the engagement devices C for establishing the forward gear position of the automatic transmission 22. The D operating position is a drive operating position in which forward traveling is enabled by executing automatic shift control with the use of all the forward gear positions, that is, the first-speed gear position "1st" to the eighth-speed gear position "8th", within a shift range (D range) in which the automatic transmission 22 is permitted to shift. The operating position "S" is a sequential operating position S (hereinafter, referred to as S operating position) for controlling the shift range of the gear position in the D position of the automatic transmission 22. The S operating position is a drive operating position in which a manual shift is enabled by changing a plurality of types of shift ranges having different shiftable high vehicle speed-side (high-side) gear positions. In the S operating position, an upshift operating position "+" and a downshift operating position "−" are provided. The upshift operating position "+" is used to upshift the shift range each operation of the shift lever 82. The downshift operating position "−" is used to downshift the shift range each operation of the shift lever 82.

Figure 5:
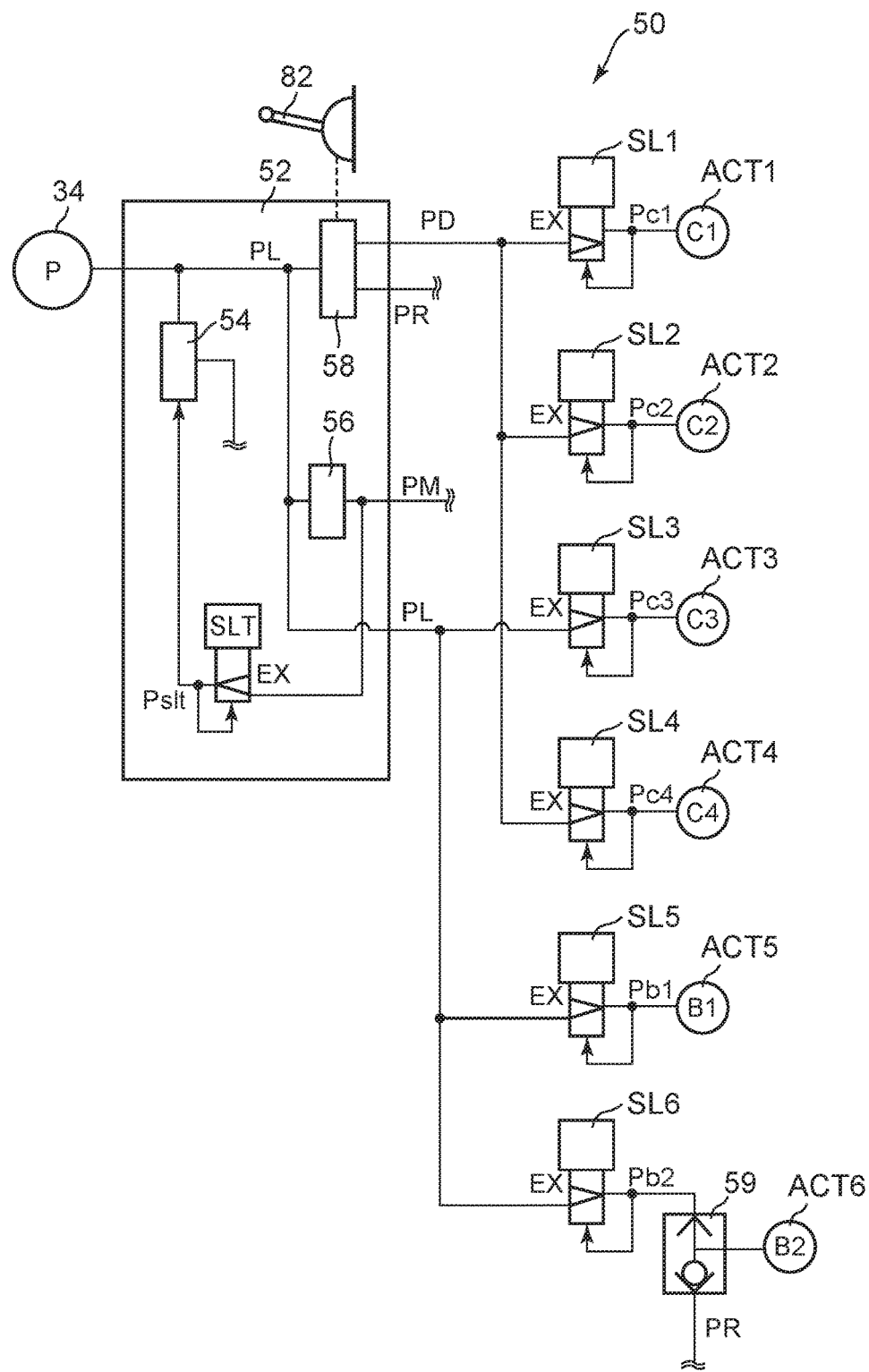
FIG. 5 is a circuit diagram that shows an example of a relevant portion of a hydraulic control circuit associated with linear solenoid valves, and the like, that control operations of hydraulic actuators of the engagement devices.

FIG. 5 is a circuit diagram that shows a relevant portion of the hydraulic control circuit 50 associated with the linear solenoid valves SL1 to SL6, and the like, that respectively control operations of the hydraulic actuators ACT1 to ACT6 of the corresponding engagement devices C. In FIG. 5, the hydraulic control circuit 50 includes a hydraulic pressure supply device 52 and the linear solenoid valves SL1 to SL6.

The hydraulic pressure supply device 52 includes a primary regulator valve 54, a linear solenoid valve SLT, a modulator valve 56 and a manual valve 58. The primary regulator valve 54 regulates a line hydraulic pressure PL using hydraulic pressure that is generated by the oil pump 34 as a source pressure. The linear solenoid valve SLT supplies a signal pressure Pslt to the primary regulator valve 54 in order for the line hydraulic pressure PL to be regulated in response to an engine load (which is synonymous with an engine torque Te, a transmission input torque Tat, and the like) represented by the throttle valve opening degree θth, and the like. The modulator valve 56 regulates a modulator hydraulic pressure PM to a constant value by using the line hydraulic pressure PL as a source pressure. The manual valve 58 mechanically switches an oil path in synchronization with shift operation of the shift lever 82. The manual valve 58 outputs the input line hydraulic pressure PL as a forward hydraulic pressure (D range pressure, drive hydraulic pressure) PD when the shift lever 82 is in the D operating position or in the S operating position. The manual valve 58 outputs the input line hydraulic pressure PL as a reverse hydraulic pressure (R range pressure, reverse hydraulic pressure) PR when the shift lever 82 is in the R operating position. When the shift lever 82 is in the N operating position or in the P operating position, the manual valve 58 shuts off the output of hydraulic pressure, and guides the drive hydraulic pressure PD and the reverse hydraulic pressure PR to a drain side. In this way, the hydraulic pressure supply device 52 outputs the line hydraulic pressure PL, the modulator hydraulic pressure PM, the drive hydraulic pressure PD and the reverse hydraulic pressure PR.

The hydraulic actuators ACT1, ACT2, ACT4 of the clutches C1, C2, C4 are supplied with hydraulic pressures Pc1, Pc2, Pc4 respectively regulated by the linear solenoid valves SL1, SL2, SL4 by using the drive hydraulic pressure PD as a source pressure. The hydraulic actuators ACT3, ACT5, ACT6 of the clutch C3 and brakes B1, B2 are supplied with hydraulic pressures Pc3, Pb1, Pb2 respectively regulated by the linear solenoid valves SL3, SL5, SL6 by using the line hydraulic pressure PL as a source pressure. The linear solenoid valves SL1 to SL6 each basically have the same configuration. Each of the linear solenoid valves SL1 to SL6 is independently excited or de-excited or undergoes current control by the electronic control unit 60, and each of the hydraulic pressures Pc1, Pc2, Pc3, Pc4, Pb1, Pb2 is independently regulated. The hydraulic control circuit 50 includes a shuttle valve 59. The hydraulic actuator ACT6 of the brake B2 is supplied via the shuttle valve 59 with hydraulic pressure that is any one of the hydraulic pressure Pb2 and the reverse hydraulic pressure PR. In this way, the hydraulic control circuit 50 supplies hydraulic pressure to the engagement devices C on the basis of the hydraulic control command signal Sat (hydraulic pressure command value) that is output from the electronic control unit 60. The manual valve 58 outputs the drive hydraulic pressure PD or the reverse hydraulic pressure PR that is a source pressure for hydraulic pressure that is supplied to the engagement devices C.

Referring back to FIG. 1, the electronic control unit 60 includes engine control means, that is, an engine control unit 62, and hydraulic control means, that is, a hydraulic control unit 64, in order to implement control functions for various control in the vehicle 10.

The engine control unit 62 calculates a required driving force Fdem by applying the accelerator operation amount θacc and the vehicle speed V (which is synonymous with the AT output rotation speed No, or the like) to a relationship (for example, a driving force map) empirically obtained or obtained by design and stored in advance (that is, predetermined). The engine control unit 62 sets a target engine torque Tetgt by which the required driving force Fdem is obtained, in consideration of a transmission loss, an auxiliary load, the gear ratio γ of the automatic transmission 22, and the like, and outputs the engine output control command signal Se for output control over the engine 12 to a throttle actuator, a fuel injection device, an ignition device, and the like, such that the target engine torque Tetgt is obtained.

The hydraulic control unit 64 executes control for switching between the engaged and released states of the engagement devices C in response to the operating position Psh of the shift lever 82. Specifically, when the operating position Psh is in the non-drive operating position that is any one of the N operating position and the P operating position, the hydraulic control unit 64 releases all the engagement devices C. When the operating position Psh is in the drive operating position that is any one of the D operating position, the S operating position and the R operating position, the hydraulic control unit 64, for example, outputs a shift command to engage the engagement devices C such that a predetermined gear position is established in accordance with the engagement operation chart shown in FIG. 3. For example, when the operating position Psh is in the D operating position, the hydraulic control unit 64 determines whether the automatic transmission 22 is caused to shift (that is, determines a gear position to be established in the automatic transmission 22) by applying the vehicle speed V (which is synonymous with the AT output rotation speed No, or the like) and the throttle valve opening degree θth (which is synonymous with the accelerator operation amount θacc, the required driving force Fdem, or the like) to a predetermined relationship (shift map, shift line map). The hydraulic control unit 64 causes the automatic transmission 22 to shift by outputting the hydraulic control command signal Sat to the hydraulic control circuit 50 as a shift command to engage and/or release the engagement devices C associated with a shift of the automatic transmission 22 such that the determined gear position is established. The linear solenoid valves SL1 to SL6 in the hydraulic control circuit 50 are driven such that the automatic transmission 22 is caused to shift in accordance with the hydraulic control command signal Sat, and the hydraulic actuators ACT1 to ACT6 of the engagement devices C associated with the shift are actuated. In this way, the hydraulic control unit 64 engages the engagement devices C associated with establishment of the gear position when the shift lever 82 is in the drive operating position, and releases all the engagement devices C when the shift lever 82 is in the non-drive operating position.

Hydraulic control over the engagement devices C in the case where the shift lever 82 is operated from the non-drive operating position to the drive operating position will be described. In this description, the N operating position is illustrated as the non-drive operating position, and the D operating position is illustrated as the drive operating position.

The hydraulic control unit 64 starts engagement transition control for outputting an engagement transitional hydraulic pressure command value that causes the engagement device C to be actuated from the released state toward the engaged state at the start point at which the shift lever 82 has been displaced from the N operating position. When the shift lever 82 is in the N operating position, it is assumed that the vehicle is stopped. For this reason, the first-speed gear position "1st" is established as the gear position of the automatic transmission 22 in the D operating position on the assumption that the vehicle starts moving. Therefore, the engagement device C is the clutch C1 that is engaged when the first-speed gear position "1st" is established. The engagement transitional hydraulic pressure command value contains a rapid charging pressure for packing in the hydraulic actuator ACT1 of the clutch C1, a constant standby pressure that is subsequent to the rapid charging pressure and that is set to a hydraulic pressure lower than the rapid charging pressure, and a sweep pressure that is gradually increased from the constant standby pressure to a complete engagement pressure (see the engagement transitional hydraulic pressure command value in FIG. 7), and is output to the hydraulic control circuit 50 as the hydraulic control command signal Sat. In the hydraulic control circuit 50, the linear solenoid valve SL1 is driven on the basis of the hydraulic control command signal Sat (engagement transitional hydraulic pressure command value), and the hydraulic pressure Pc1 is supplied to the clutch C1. In the present embodiment, such engagement transition control is referred to as N-to-D control. When the shift lever 82 is displaced from the N operating position, the shift lever 82 is not always operated to the D operating position. When a mode in which control is executed on the assumption that the shift lever 82 is in the D operating position in the event of a malfunction that the operating position Psh is not detected is employed, it is useful to start the N-to-D control when the shift lever 82 has been displaced from the N operating position.

Depending on variations, aging, and the like, of components associated with engagement of the clutch C1, there is a possibility that a time up to completion of engagement of the clutch C1 is shorter or longer for the same engagement transitional hydraulic pressure command value. In order to complete the N-to-D control in an intended time, the electronic control unit 60 executes learning control for increasing the engagement transitional hydraulic pressure command value in the next N-to-D control such that a time up to completion of engagement of the clutch C1 becomes shorter when the time is long, and reducing the engagement transitional hydraulic pressure command value in the next N-to-D control such that a time up to completion of engagement of the clutch C1 becomes longer when the time is short.

In order to implement the above-described learning control over the engagement transitional hydraulic pressure command value, the electronic control unit 60 further includes operating position determination means, that is, an operating position determination unit 65, engagement transition time determination means, that is, an engagement transition time determination unit 66, and learning control means, that is, a learning control unit 67.

The operating position determination unit 65 determines whether the operating position Psh of the shift lever 82 has been displaced from the N operating position (that is, whether the N operating position signal has switched from an on state to an off state). The operating position determination unit 65 determines whether the operating position Psh of the shift lever 82 has been shifted into the D operating position (that is, whether the D operating position signal has switched from an off state to an on state). The operating position determination unit 65 determines whether the operating position Psh of the shift lever 82 has been shifted into an operating position other than the D operating position (that is, whether another operating position signal has switched from an off state to an on state).

When the operating position determination unit 65 determines that the N operating position signal has switched from the on state to the off state, the hydraulic control unit 64 starts the N-to-D control. After the operating position determination unit 65 determines that the N operating position signal has switched from the on state to the off state, when the operating position determination unit 65 determines that the D operating position signal has switched from the off state to the on state, the hydraulic control unit 64 continuously executes the started N-to-D control. On the other hand, after the operating position determination unit 65 determines that the N operating position signal has switched from the on state to the off state, when the operating position determination unit 65 determines that the D operating position signal has not switched from the off state to the on state and the operating position determination unit 65 determines that an operating position signal other than the D operating position signal has switched from the off state to the on state, the hydraulic control unit 64 intermits the started N-to-D control.

The engagement transition time determination unit 66 determines whether an engagement transition time from when the N-to-D control is started by the hydraulic control unit 64 to when the clutch C1 begins to develop a predetermined torque capacity is longer or shorter than a predetermined target time. The engagement transition time is an inertia phase start time from when the N-to-D control is started by the hydraulic control unit 64 to when the AT input rotation speed Ni (which is synonymous with the turbine rotation speed Nt) begins to vary. For this reason, the engagement transition time determination unit 66 determines whether the inertia phase has started on the basis of whether the AT input rotation speed Ni has decreased by a predetermined number of revolutions while the N-to-D control is being executed by the hydraulic control unit 64. When the engagement transition time determination unit 66 determines that the inertia phase has started, the engagement transition time determination unit 66 determines whether the inertia phase start time from when the N-to-D control is started to when it is determined that the AT input rotation speed Ni has decreased by the predetermined number of revolutions is longer or shorter than the predetermined target time. The predetermined number of revolutions is, for example, a predetermined inertia phase start determination threshold at which it is determined that the AT input rotation speed Ni has reliably decreased toward a zero rotation speed. The predetermined target time is, for example, a predetermined target value of the inertia phase start time for causing the N-to-D control to complete in an intended time. When the drive wheels 14 side is driven from the engine 12 side to rotate, as described above, the first-speed gear position "1st" is established only by engaging the clutch C1, so, when the first-speed gear position "1st" is established during a stop of the vehicle, the AT input rotation speed Ni is constrained by the rotation of the drive wheels 14 and is set to the zero rotation speed.

When the engagement transition time determination unit 66 determines that the inertia phase start time is longer than the predetermined target time, the learning control unit 67 performs learning such that the engagement transitional hydraulic pressure command value that is used in the next N-to-D control is increased. On the other hand, when the engagement transition time determination unit 66 determines that the inertia phase start time is shorter than the predetermined target time, the learning control unit 67 performs learning such that the engagement transitional hydraulic pressure command value that is used in the next N-to-D control is reduced. The engagement transitional hydraulic pressure command value to be corrected in learning control is, for example, the magnitude of the constant standby pressure in the engagement transitional hydraulic pressure command value. When the inertia phase start time is longer than the predetermined target time, the constant standby pressure is insufficient in hydraulic pressure, so the learning control unit 67 corrects the magnitude of the constant standby pressure such that the magnitude increases. On the other hand, when the inertia phase start time is shorter than the predetermined target time, the constant standby pressure is excessive in hydraulic pressure, so the learning control unit 67 corrects the magnitude of the constant standby pressure such that the magnitude reduces. A correction amount at the time of correction may be, for example, a predetermined constant value or may be a value based on a difference between the inertia phase start time and the predetermined target time (for example, a value that is increased as the difference increases).

Figure 6:
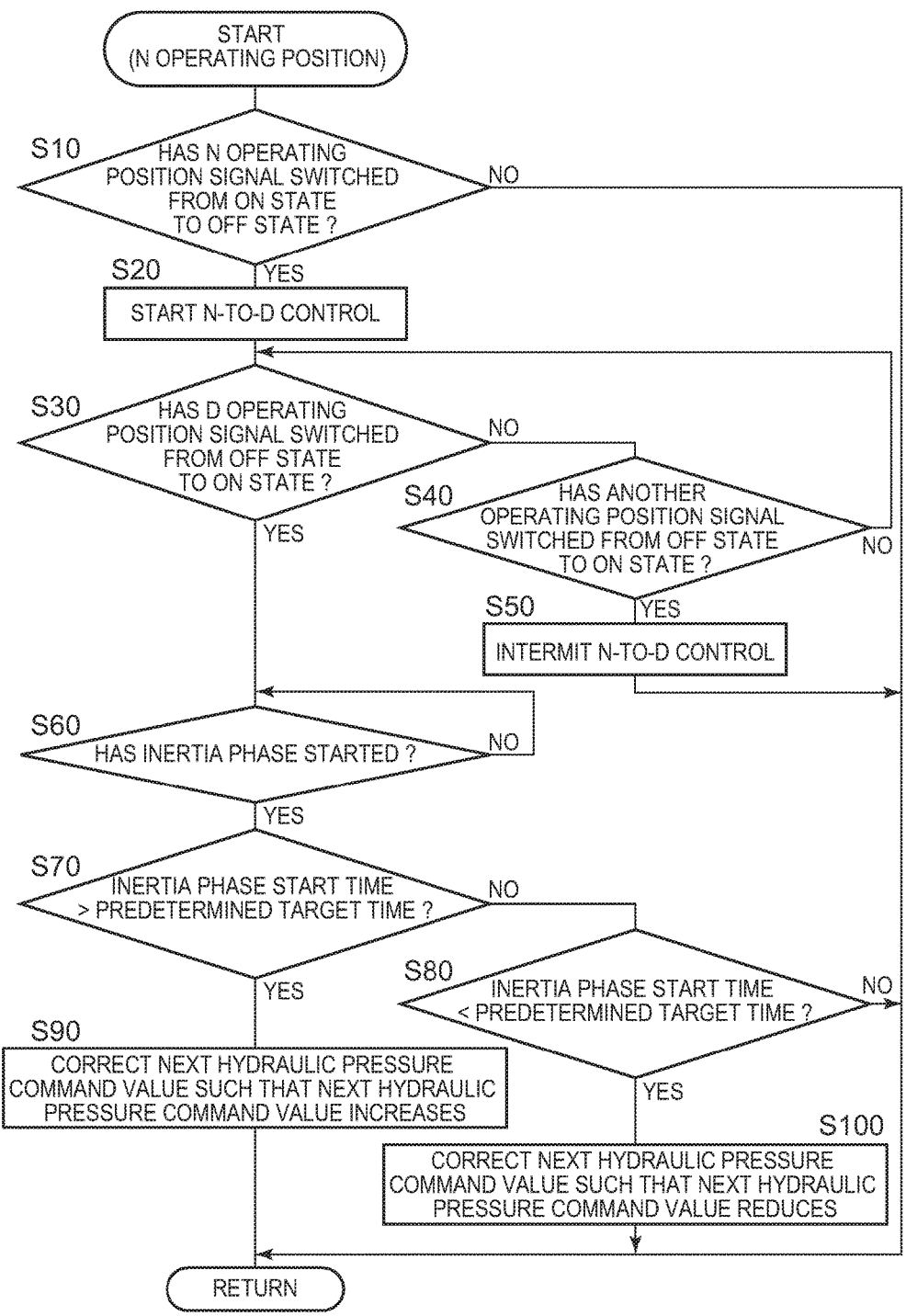
FIG. 6 is a flowchart that illustrates a relevant portion of control operations of an electronic control unit, that is, control operations for learning an engagement transitional hydraulic pressure command value that is used in N-to-D control.
Figure 7:
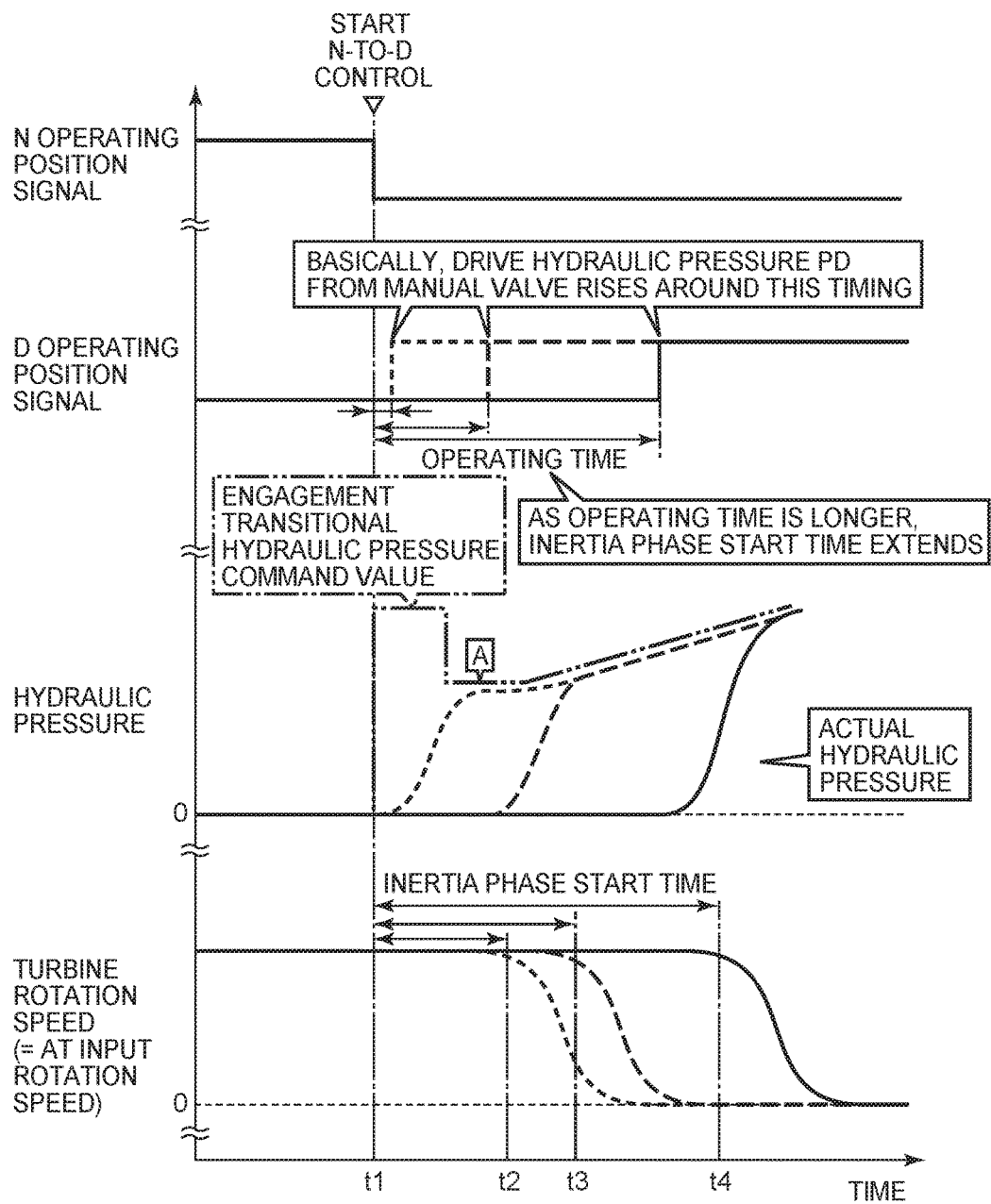
FIG. 7 is an example of a timing chart that illustrates learning control over an engagement transitional hydraulic pressure command value, which is executed in the control operations shown in the flowchart of FIG. 6.

FIG. 6 is a flowchart that illustrates a relevant portion of control operations of the electronic control unit 60, that is, control operations for learning an engagement transitional hydraulic pressure command value that is used in the N-to-D control. The flowchart is, for example, repeatedly executed when the shift lever 82 is in the N operating position. FIG. 7 is an example of a timing chart that illustrates learning control over an engagement transitional hydraulic pressure command value, which is executed in the control operations shown in the flowchart of FIG. 6.

In FIG. 6, initially, in step (hereinafter, step is omitted) S10 corresponding to the function of the operating position determination unit 65, it is determined whether the N operating position signal has switched from the on state to the off state. When negative determination is made in S10, the routine is ended. When affirmative determination is made in S10, the N-to-D control is started in S20 corresponding to the function of the hydraulic control unit 64. Subsequently, in S30 corresponding to the function of the operating position determination unit 65, it is determined whether the D operating position signal has switched from the off state to the on state. When negative determination is made in S30, it is determined in S40 corresponding to the function of the operating position determination unit 65 whether an operating position signal other than the D operating position signal has switched from the off state to the on state. When negative determination is made in S40, the process is returned to S30. When affirmative determination is made in S40, the N-to-D control started in S20 is intermitted in S50 corresponding to the function of the hydraulic control unit 64. On the other hand, when affirmative determination is made in S30, it is determined in S60 corresponding to the function of the engagement transition time determination unit 66 whether the inertia phase has started on the basis of whether the AT input rotation speed Ni (which is synonymous with the turbine rotation speed Nt) has decreased by the predetermined number of revolutions during execution of the N-to-D control started in S20. When negative determination is made in S60, the process is returned to S60. When affirmative determination is made in S60, it is determined in S70 corresponding to the function of the engagement transition time determination unit 66 whether the inertia phase start time from when the N-to-D control is started in S20 to when it is determined in S60 that the inertia phase has started is longer than the predetermined target time. When negative determination is made in S70, it is determined in S80 corresponding to the function of the engagement transition time determination unit 66 whether the inertia phase start time is shorter than the predetermined target time. When negative determination is made in S80, the routine is ended. When affirmative determination is made in S70, in S90 corresponding to the function of the learning control unit 67, learning control is executed to correct the engagement transitional hydraulic pressure command value that is used in the next N-to-D control such that the engagement transitional hydraulic pressure command value increases. When affirmative determination is made in S80, in S100 corresponding to the function of the learning control unit 67, learning control is executed to correct the engagement transitional hydraulic pressure command value that is used in the next N-to-D control such that the engagement transitional hydraulic pressure command value reduces.

In FIG. 7, time t1 indicates that the N-to-D control has started as a result of switching of the N operating position signal from the on state to the off state. In this N-to-D control, the engagement transitional hydraulic pressure command value indicated by the alternate long and two-short dashed line is output, and the clutch C1 is actuated from the released state toward the engaged state. During this N-to-D control, the start of the inertia phase is determined (see time t2, time t3, time t4). When the inertia phase start time from when the N-to-D control has been started to when the start of the inertia phase is determined is longer than the predetermined target time, the magnitude of the constant standby pressure (see A in the drawing) in the engagement transitional hydraulic pressure command value that is used in the next N-to-D control is corrected to increase. On the other hand, when the inertia phase start time is shorter than the predetermined target time, the magnitude of the constant standby pressure is corrected to reduce.

Incidentally, the inertia phase start time is not only varied as a result of a variation in constant standby pressure in the engagement transitional hydraulic pressure command value during the N-to-D control but also, as shown in FIG. 7, is extended as the operating time from when the shift lever 82 has been displaced from the non-drive operating position (here, the N operating position) to when the shift lever 82 has been shifted into the drive operating position (here, the D operating position) (hereinafter, referred to as N-to-D operating time) extends. When the shift lever 82 is shifted into the D operating position, the drive hydraulic pressure PD that is a source pressure of the hydraulic pressure Pc1 of the clutch C1 is output from the manual valve 58. Therefore, as the N-to-D operating time extends, the rising of the actual hydraulic pressure Pc1 delays with respect to the engagement transitional hydraulic pressure command value, and the inertia phase start time that is an index of learning control becomes longer. This means that learning control is influenced by artificial operation.

Figure 8:
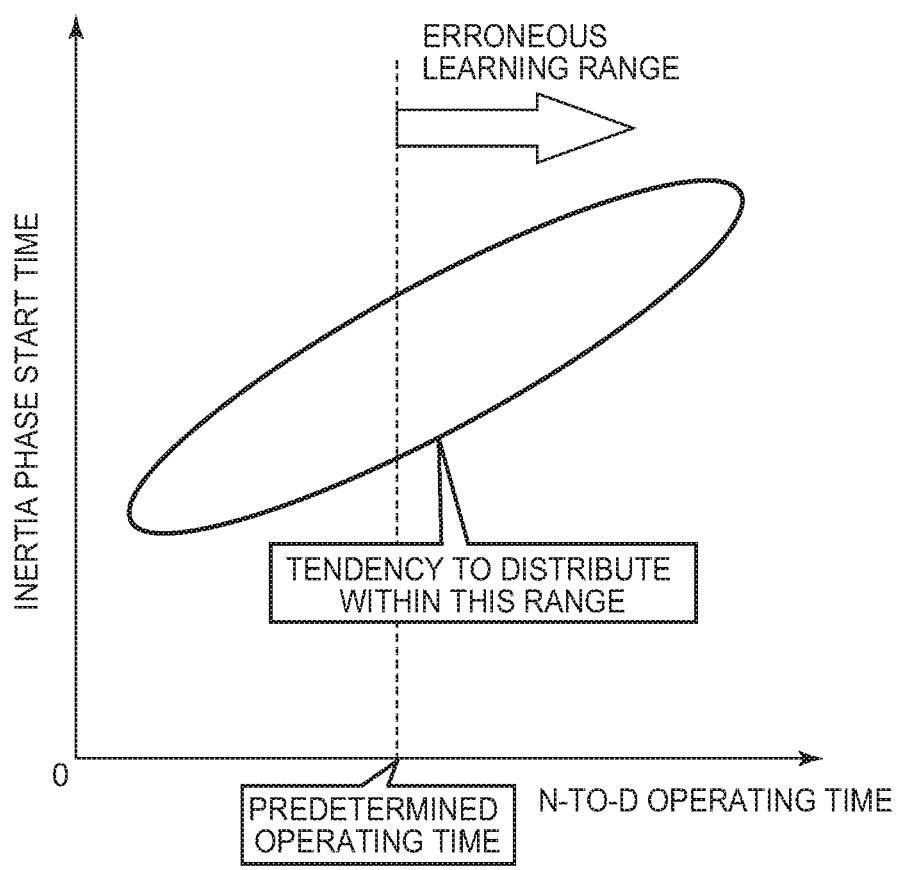
FIG. 8 is a graph that shows an example of the relationship between an N-to-D operating time and an inertia phase start time.

FIG. 8 is a view that shows an example of the relationship between an N-to-D operating time and an inertia phase start time. In FIG. 8, as the N-to-D operating time extends, the inertia phase start time tends to be made longer. In learning control over the engagement transitional hydraulic pressure command value during the N-to-D control, it was found that, in the range in which the N-to-D operating time exceeds a predetermined operating time, the engagement transitional hydraulic pressure command value is easily erroneously learned. The erroneous learning range in which the N-to-D operating time exceeds the predetermined operating time in FIG. 8 is a range in which the influence of the N-to-D operating time increases in the learning control, and the predetermined operating time is a predetermined erroneous learning range determination threshold for determining that the N-to-D operating time falls within the erroneous learning range.

In order to reduce erroneous learning in the above-described learning control over the engagement transitional hydraulic pressure command value, the electronic control unit 60 further includes operating time determination means, that is, an operating time determination unit 68, and learning control execution determination means, that is, a learning control execution determination unit 69.

The operating time determination unit 68 determines whether the N-to-D operating time from when the operating position determination unit 65 determines that the operating position Psh of the shift lever 82 has been displaced from the N operating position to when the operating position determination unit 65 determines that the operating position Psh of the shift lever 82 has been shifted into the D operating position is longer than the predetermined operating time.

When the operating time determination unit 68 determines that the N-to-D operating time is shorter than or equal to the predetermined operating time, the learning control execution determination unit 69 permits the learning control unit 67 to learn the engagement transitional hydraulic pressure command value in the next N-to-D control or validates the engagement transitional hydraulic pressure command value learned by the learning control unit 67. On the other hand, when the operating time determination unit 68 determines that the N-to-D operating time is longer than the predetermined operating time, the learning control execution determination unit 69 prohibits the learning control unit 67 from learning the engagement transitional hydraulic pressure command value in the next N-to-D control or invalidates the engagement transitional hydraulic pressure command value learned by the learning control unit 67. In the embodiment in which the learning control unit 67 is prohibited from learning, in the N-to-D control that is executed by the hydraulic control unit 64, the learning control unit 67 does not learn the engagement transitional hydraulic pressure command value that is used in the next N-to-D control. In this case, the engagement transition time determination unit 66 does not need to determine whether the inertia phase has started while the hydraulic control unit 64 is executing the N-to-D control. In the embodiment in which the result learned by the learning control unit 67 is invalidated, in the N-to-D control that is executed by the hydraulic control unit 64, the learning control unit 67 learns the engagement transitional hydraulic pressure command value that is used in the next N-to-D control; however, the engagement transitional hydraulic pressure command value corrected as a result of the learning is not used in the next N-to-D control. The engagement transitional hydraulic pressure command value used in the current N-to-D control is used in the next N-to-D control. That is, the learning control unit 67 does not update the engagement transitional hydraulic pressure command value corrected as a result of learning as the engagement transitional hydraulic pressure command value that is used in the next N-to-D control.

FIG. 9 is a flowchart that illustrates a relevant portion of control operations of the electronic control unit 60, that is, control operations for preventing a decrease in the accuracy of learning an engagement transitional hydraulic pressure command value that is used in the N-to-D control. The flowchart is, for example, repeatedly executed when the shift lever 82 is in the N operating position. S10 to S50 in the flowchart of FIG. 9 are the same as S10 to S50 in the flowchart of FIG. 6. The flowchart of FIG. 9 is executed in parallel with the flowchart of FIG. 6. In the following description, the description of S10 to S50 in the flowchart of FIG. 9 is omitted.

In FIG. 9, when affirmative determination is made in S30, it is determined in S110 corresponding to the function of the operating time determination unit 68 whether the N-to-D operating time from when it is determined in S10 that the N operating position signal has switched from the on state to the off state to when it is determined in S30 that the D operating position signal has switched from the off state to the on state is longer than the predetermined operating time. When affirmative determination is made in S110, in S120 corresponding to the function of the learning control execution determination unit 69, learning of the engagement transitional hydraulic pressure command value for the next N-to-D control, which is performed in S60 to S100 in the flowchart of FIG. 6, is prohibited or the engagement transitional hydraulic pressure command value learned in S60 to S100 in the flowchart of FIG. 6 is invalidated. On the other hand, when negative determination is made in S110, in S130 corresponding to the function of the learning control execution determination unit 69, learning of the engagement transitional hydraulic pressure command value for the next N-to-D control, which is performed in S60 to S100 in the flowchart of FIG. 6, is permitted or the engagement transitional hydraulic pressure command value learned in S60 to S100 in the flowchart of FIG. 6 is validated.

As described above, according to the present embodiment, when the N-to-D operating time from when the shift lever 82 has been displaced from the N operating position to when the shift lever 82 has been shifted into the D operating position is longer than the predetermined operating time, learning of the engagement transitional hydraulic pressure command value, which is used in the N-to-D control that starts at a start point at which the shift lever 82 has been displaced from the N operating position, is prohibited or the learned engagement transitional hydraulic pressure command value is invalidated. Therefore, when the N-to-D operating time is longer than the predetermined operating time, the engagement transition time from when the N-to-D control is started to when the clutch C1 begins to develop the predetermined torque capacity extends; however, in this case, the engagement transitional hydraulic pressure command value that is used in the next N-to-D control is not increased. Thus, it is possible to prevent a decrease in the accuracy of learning an engagement transitional hydraulic pressure command value that is used in the N-to-D control.

According to the present embodiment, the engagement transition time is the inertia phase start time from when the N-to-D control is started to when the AT input rotation speed Ni (which is synonymous with the turbine rotation speed Nt) begins to vary, so the engagement transition time is appropriately detected on the basis of a variation in the AT input rotation speed Ni.

According to the present embodiment, the source pressure of the hydraulic pressure Pc1 that is supplied to the clutch C1 on the basis of the engagement transitional hydraulic pressure command value is output from the manual valve 58 of which the oil path is mechanically switched in synchronization with shift operation of the shift lever 82, so, when the N-to-D operating time is longer than the predetermined operating time, the rising of the actual hydraulic pressure Pc1 that is supplied to the clutch C1 delays, and the inertia phase start time extends. In this case, by prohibiting learning of the engagement transitional hydraulic pressure command value or invalidating the learned engagement transitional hydraulic pressure command value such that the engagement transitional hydraulic pressure command value that is used in the next N-to-D control is not increased, it is possible to prevent a decrease in the accuracy of learning the engagement transitional hydraulic pressure command value that is used in the N-to-D control.

The embodiment is described in detail with reference to the accompanying drawings; however, the disclosure is also applicable to other embodiments.

For example, in the above-described embodiment, the N operating position is illustrated as the non-drive operating position, the D operating position is illustrated as the drive operating position, and hydraulic control over the engagement devices C in the case where the shift lever 82 has been operated from the non-drive operating position to the drive operating position is described; however, the disclosure is not limited to this mode. For example, the non-drive operating position may be the P operating position, and the drive operating position may be the R operating position. The time when the vehicle is stopped is illustrated as the time at which the shift lever 82 is in the N operating position; however, the disclosure is not limited to this mode. For example, the time when the shift lever 82 is in the N operating position may be the time when the shift lever 82 has been operated to the N operating position while the vehicle is traveling. In this case, a gear position based on a traveling state is established as the gear position of the automatic transmission 22 in the D operating position. For this reason, the engagement device C is not always the clutch C1. The disclosure is also applicable to the case illustrated above.

In the above-described embodiment, the engagement transitional hydraulic pressure command value that is corrected through learning control is the magnitude of the constant standby pressure in the engagement transitional hydraulic pressure command value; however, the disclosure is not limited to this mode. For example, the length of a designated time of the constant standby pressure may be corrected through learning control or the magnitude of the rapid charging pressure in the engagement transitional hydraulic pressure command value and/or the length of a designated time of the rapid charging pressure may be corrected through learning control. Varying the length of the designated time is to vary an integral value of hydraulic pressure in the engagement transitional hydraulic pressure command value. Extending the designated time may be regarded as increasing the engagement transitional hydraulic pressure command value or reducing the designated time may be regarded as reducing the engagement transitional hydraulic pressure command value.

In the above-described embodiment, the predetermined target time that is the target value of the inertia phase start time may be the range of a target time with a certain width of time.

In the above-described embodiment, the engine 12 is illustrated as the driving force source. Another prime mover, such as an electric motor, may be employed solely or employed in combination with the engine 12 as the driving force source. The torque converter 20 is illustrated as the fluid transmission device. The fluid transmission device may be a fluid coupling having no torque amplification function or may be not necessarily provided. The S operating position that is one of the operating positions Psh of the shift lever 82 may be a manual shift operating position for shifting the gear position of the automatic transmission 22 in response to operation of the shift lever 82 or may be not necessarily provided.

In the above-described embodiment, forward eight gear positions are established in the automatic transmission 22; however, the disclosure is not limited to this mode. The automatic transmission 22 may be an automatic transmission in which a plurality of gear positions having different gear ratios are established by selectively engaging any of a plurality of engagement devices. Instead of the automatic transmission 22, for example, an automatic transmission may be a synchromesh parallel two-shaft automatic transmission that includes a plurality of pairs of constant mesh shift gears between two shafts and of which a speed position is automatically changed by controlling engaged or released states of dog clutches (that is, intermeshing clutches) by actuators, a dual clutch transmission (DCT) that is the synchromesh parallel two-shaft automatic transmission and that includes two-line input shafts, or a continuously variable transmission. In the vehicle power transmission system including such an automatic transmission, an engagement device that connects or interrupts a power transmission path between a driving force source and a drive wheel is provided in addition to the automatic transmission. For example, in the vehicle power transmission system including a continuously variable transmission, a clutch provided in a forward/reverse switching device functions as the engagement device. The vehicle power transmission system may not necessarily include an automatic transmission. For example, in an electric vehicle, a vehicle power transmission system may be configured not to include an automatic transmission but include an engagement device that connects or interrupts a power transmission path between an electric motor and a drive wheel. In short, in a vehicle power transmission system including an engagement device that connects or interrupts a power transmission path between a driving force source and a drive wheel, the disclosure is applicable as long as a control apparatus for a vehicle power transmission system, including a hydraulic control unit that engages the engagement device when the operating member is in the drive operating position and that releases the engagement device when the operating member is in the non-drive operating position.

The above-described embodiment is only illustrative, and the control apparatus or control method may be implemented in modes including various modifications or improvements on the basis of the knowledge of persons skilled in the art.

What is claimed is:

1. A control apparatus for a power transmission system for a vehicle, the vehicle including a driving force source, a drive wheel, an engagement device and an operating member, the engagement device being configured to connect or interrupt a power transmission path between the driving force source and the drive wheel, the control apparatus comprising an electronic control unit configured to:
  execute control for engaging the engagement device when the operating member is in a drive operating position;
  execute control for releasing the engagement device when the operating member is in a non-drive operating position;
  start engagement transition control for outputting an engagement transitional hydraulic pressure command value that causes the engagement device to be actuated from a released state toward an engaged state at a start point at which the operating member has been displaced from the non-drive operating position;
  determine whether an engagement transition time from when the engagement transition control is started to when the engagement device begins to develop a predetermined torque capacity is longer or shorter than a predetermined target time;
  when the engagement transition time is longer than the predetermined target time, learn the engagement transitional hydraulic pressure command value that is used in next engagement transition control such that the engagement transitional hydraulic pressure command value increases;
  when the engagement transition time is shorter than the predetermined target time, learn the engagement transitional hydraulic pressure command value that is used in the next engagement transition control such that the engagement transitional hydraulic pressure command value reduces;
  determine whether an operating time from when the operating member has been displaced from the non-drive operating position to when the operating member has been shifted into the drive operating position is longer than a predetermined operating time; and
  prohibit learning of the engagement transitional hydraulic pressure command value when the operating time is longer than the predetermined operating time.

2. The control apparatus according to claim 1, wherein
the operating time is an operating time from when the operating member has been displaced from a neutral operating position to when the operating member has been shifted into a forward drive operating position,
the neutral operating position is an operating position in which the power transmission path between the driving force source and the drive wheel is placed in a neutral state where transmission of power is disabled by releasing the engagement device, and
the forward drive operating position is an operating position in which the power transmission path is placed in a power transmittable state where a power transmission path for forward traveling is established by engaging the engagement device.

3. The control apparatus according to claim 1, wherein
the power transmission system includes an automatic transmission,
the automatic transmission constitutes part of the power transmission path between the driving force source and the drive wheel,
the automatic transmission includes an input rotating member, and
the engagement transition time is an inertia phase start time from when the engagement transition control is started to when a rotation speed of the input rotating member begins to vary.

4. The control apparatus according to claim 1, wherein
the power transmission system includes a hydraulic control circuit,
the hydraulic control circuit is configured to supply hydraulic pressure to the engagement device based on the engagement transitional hydraulic pressure command value,
the hydraulic control circuit includes a manual valve, and
the manual valve is configured to mechanically switch an oil path in synchronization with shift operation of the operating member such that a source pressure of hydraulic pressure that is supplied to the engagement device is output.

5. A control apparatus for a power transmission system for a vehicle, the vehicle including a driving force source, a drive wheel, an engagement device and an operating member, the engagement device being configured to connect or interrupt a power transmission path between the driving force source and the drive wheel, the control apparatus comprising
an electronic control unit configured to:
  execute control for engaging the engagement device when the operating member is in a drive operating position;
  execute control for releasing the engagement device when the operating member is in a non-drive operating position;
  start engagement transition control for outputting an engagement transitional hydraulic pressure command value that causes the engagement device to be actuated from a released state toward an engaged state at a start point at which the operating member has been displaced from the non-drive operating position;
  determine whether an engagement transition time from when the engagement transition control is started to when the engagement device begins to develop a predetermined torque capacity is longer or shorter than a predetermined target time;
  when the engagement transition time is longer than the predetermined target time, learn the engagement transitional hydraulic pressure command value that is used in next engagement transition control such that the engagement transitional hydraulic pressure command value increases;
  when the engagement transition time is shorter than the predetermined target time, learn the engagement transitional hydraulic pressure command value that is used in the next engagement transition control such that the engagement transitional hydraulic pressure command value reduces;
  determine whether an operating time from when the operating member has been displaced from the non-drive operating position to when the operating member has been shifted into the drive operating position is longer than a predetermined operating time; and
  invalidate the learned engagement transitional hydraulic pressure command value when the operating time is longer than the predetermined operating time.

6. The control apparatus according to claim 5, wherein
the operating time is an operating time from when the operating member has been displaced from a neutral operating position to when the operating member has been shifted into a forward drive operating position,
the neutral operating position is an operating position in which the power transmission path between the driving force source and the drive wheel is placed in a neutral state where transmission of power is disabled by releasing the engagement device, and the forward drive operating position is an operating position in which the power transmission path is placed in a power transmittable state where a power transmission path for forward traveling is established by engaging the engagement device.

7. The control apparatus according to claim 5, wherein
the power transmission system includes an automatic transmission,
the automatic transmission constitutes part of the power transmission path between the driving force source and the drive wheel,
the automatic transmission includes an input rotating member, and
the engagement transition time is an inertia phase start time from when the engagement transition control is started to when a rotation speed of the input rotating member begins to vary.

8. The control apparatus according to claim 5, wherein
the power transmission system includes a hydraulic control circuit,
the hydraulic control circuit is configured to supply hydraulic pressure to the engagement device based on the engagement transitional hydraulic pressure command value,
the hydraulic control circuit includes a manual valve, and
the manual valve is configured to mechanically switch an oil path in synchronization with shift operation of the operating member such that a source pressure of hydraulic pressure that is supplied to the engagement device is output.

9. A control method for a power transmission system for a vehicle, the vehicle including a driving force source, a drive wheel, an engagement device, an operating member and an electronic control unit, the engagement device being configured to connect or interrupt a power transmission path between the driving force source and the drive wheel, the control method comprising:

executing, by the electronic control unit, control for engaging the engagement device when the operating member is in a drive operating position;

executing, by the electronic control unit, control for releasing the engagement device when the operating member is in a non-drive operating position;

starting, by the electronic control unit, engagement transition control for outputting an engagement transitional hydraulic pressure command value that causes the engagement device to be actuated from a released state toward an engaged state at a start point at which the operating member has been displaced from the non-drive operating position;

determining, by the electronic control unit, whether an engagement transition time from when the engagement transition control is started to when the engagement device begins to develop a predetermined torque capacity is longer or shorter than a predetermined target time;

when the engagement transition time is longer than the predetermined target time, learning, by the electronic control unit, the engagement transitional hydraulic pressure command value that is used in next engagement transition control such that the engagement transitional hydraulic pressure command value increases;

when the engagement transition time is shorter than the predetermined target time, learning, by the electronic control unit, the engagement transitional hydraulic pressure command value that is used in the next engagement transition control such that the engagement transitional hydraulic pressure command value reduces;

determining, by the electronic control unit, whether an operating time from when the operating member has been displaced from the non-drive operating position to when the operating member has been shifted into the drive operating position is longer than a predetermined operating time; and prohibiting, by the electronic control unit, learning of the engagement transitional hydraulic pressure command value when the operating time is longer than the predetermined operating time.

10. A control method for a power transmission system for a vehicle, the vehicle including a driving force source, a drive wheel, an engagement device, an operating member and an electronic control unit, the engagement device being configured to connect or interrupt a power transmission path between the driving force source and the drive wheel, the control method comprising:

executing, by the electronic control unit, control for engaging the engagement device when the operating member is in a drive operating position;

executing, by the electronic control unit, control for releasing the engagement device when the operating member is in a non-drive operating position;

starting, by the electronic control unit, engagement transition control for outputting an engagement transitional hydraulic pressure command value that causes the engagement device to be actuated from a released state toward an engaged state at a start point at which the operating member has been displaced from the non-drive operating position;

determining, by the electronic control unit, whether an engagement transition time from when the engagement transition control is started to when the engagement device begins to develop a predetermined torque capacity is longer or shorter than a predetermined target time;

when the engagement transition time is longer than the predetermined target time, learning, by the electronic control unit, the engagement transitional hydraulic pressure command value that is used in next engagement transition control such that the engagement transitional hydraulic pressure command value increases;

when the engagement transition time is shorter than the predetermined target time, learning, by the electronic control unit, the engagement transitional hydraulic pressure command value that is used in the next engagement transition control such that the engagement transitional hydraulic pressure command value reduces;

determining, by the electronic control unit, whether an operating time from when the operating member has been displaced from the non-drive operating position to when the operating member has been shifted into the drive operating position is longer than a predetermined operating time; and invalidating, by the electronic control unit, the learned engagement transitional hydraulic pressure command value when the operating time is longer than the predetermined operating time.

* * * * *